United States Patent
Lee et al.

(10) Patent No.: US 10,195,902 B1
(45) Date of Patent: Feb. 5, 2019

(54) REAL-TIME ENGINE SOUND REPRODUCTION METHOD AND VEHICLE USING THE REAL-TIME ENGINE SOUND REPRODUCTION METHOD

(71) Applicants: HYUNDAI MOTOR COMPANY, Seoul (KR); KIA MOTORS CORPORATION, Seoul (KR)

(72) Inventors: Dong-Chul Lee, Anyang-si (KR); In-Soo Jung, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/835,220

(22) Filed: Dec. 7, 2017

(30) Foreign Application Priority Data

Oct. 17, 2017  (KR) .......................... 10-2017-0134564

(51) Int. Cl.
| | |
|---|---|
| *B60Q 9/00* | (2006.01) |
| *B60C 9/00* | (2006.01) |
| *H04R 3/04* | (2006.01) |
| *B60R 16/023* | (2006.01) |

(52) U.S. Cl.
CPC ............ *B60C 9/00* (2013.01); *B60R 16/0231* (2013.01); *H04R 3/04* (2013.01); *H04R 2499/13* (2013.01)

(58) Field of Classification Search
CPC .. H04R 2499/13; H04R 3/04; B60R 16/0231; B60Q 9/00
USPC .......................................................... 381/86
See application file for complete search history.

(56) References Cited

U.S. PATENT DOCUMENTS

2016/0205472 A1* 7/2016 Violi ...................... G10K 15/02
381/86

FOREIGN PATENT DOCUMENTS

KR   10-2017-0002973 A   1/2017

* cited by examiner

*Primary Examiner* — Paul S Kim
(74) *Attorney, Agent, or Firm* — McDermott Will & Emery LLP (57) ABSTRACT

A real-time engine sound reproduction method includes determining, with a signal processing controller, a drive condition of a vehicle based on a vibration value measured through a sensor for measuring vibration of an engine, and reproducing, with an output device, a controlled engine sound based on an order component indicated by the engine vibration characteristic outputted in real time.

13 Claims, 8 Drawing Sheets

REAL-TIME ENGINE SOUND REPRODUCTION METHOD AND VEHICLE USING THE REAL-TIME ENGINE SOUND REPRODUCTION METHOD

CROSS-REFERENCE(S) TO RELATED APPLICATIONS

This application claims the benefit of priority to Korean Patent Application No. 10-2017-0134564, filed on Oct. 17, 2017 with the Korean Intellectual Property Office, which is incorporated herein by reference in its entirety.

TECHNICAL FIELD

Exemplary embodiments of the present disclosure relate to an engine sound reproduction method, and particularly, to a vehicle using a real-time engine sound reproduction method which actively reproduces virtual engine sound in real time based on various engine sensor values.

BACKGROUND

The engine sound control technique for vehicles, which is commonly applied to vehicles, improves a driver's enjoyment through auditory and visual effects, and raises the merchantable quality of a vehicle.

Examples of engine sound control techniques for vehicles include a virtual sound source playing method and a vibration sound providing method. For example, the virtual sound source play method provides interior sound by playing a recorded virtual sound source, and the vibration sound providing method provides artificial sound by vibrating (physically affecting, moving or contacting) a vehicle body, thereby improving a driver's enjoyment through auditory effects.

For these operations, the virtual sound source play method requires a recorded virtual sound source and an engine sound equalizer to perform volume control based on a load variation (for example, accelerator pedal position), and the vibration sound providing method requires a vibrator, or other acoustic of physical device, mounted in a vehicle so as to vibrate the vehicle body.

However, both of the virtual sound source play method and the vibration sound providing method have a limitation in that they artificially produces sound without considering load variations and power characteristics of an engine.

SUMMARY OF THE DISCLOSURE

Exemplary embodiments of the present disclosure are directed to a real-time engine sound reproduction method which actively reproduces engine sound based on engine characteristic sensor values measured in real time, and provides sound for maintaining silence when a vehicle is driven at a constant speed, but provides a variety of sounds when the vehicle is accelerated, thereby providing an engine sound suitable for a driver's intention for passing or acceleration, and a vehicle using the same.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with an embodiment of the present disclosure, there is provided a real-time engine sound reproduction method in which a signal processing controller generates an engine order-based virtual engine sound through an engine vibration characteristic by an operation of the engine, and the engine order-based virtual engine sound is outputted as an engine characteristic-based engine sound and reproduced as a virtual engine sound by an audio device.

The engine order-based virtual engine sound may be generated by combining an engine order component generated by rotation of the engine, an engine level change for each load of the engine, and a master volume.

The engine order component may be extracted as a vibration signal and pressure signal based on the operation of the engine, and the pressure signal may be any one of combustion pressure, boost pressure and exhaust pressure. The extraction of the engine order component may reflect detection values of an engine RPM, an accelerator pedal position value and a vehicle speed, which change the engine level for each load of the engine.

The engine characteristic-based engine sound may be divided into a drive mode-based output to which a drive mode of the vehicle is applied and a vehicle speed-based output to which an operation state of the vehicle is applied, and the drive mode-based output and the vehicle speed-based output are reproduced as the engine sound by the audio device.

The engine characteristic-based engine sound may be generated by combining a drive mode-based virtual engine sound and a vehicle speed-based virtual engine sound with an octave band.

The drive mode may include an echo drive mode, a comport drive mode and a sport drive mode. The vehicle speed-based output may be based on a constant speed and acceleration through an operation of an accelerator pedal. During the acceleration condition, a differential value for the constant speed may be utilized.

In accordance with another embodiment of the present disclosure, there is provided a vehicle including an engine sound reproduction device that generates an engine characteristic-based engine sound by combining an engine order-based virtual engine sound based on an engine vibration characteristic by an operation of the engine with a drive mode-based virtual engine sound and a vehicle speed-based virtual engine sound, and reproduces the engine characteristic-based engine sound in real time during an operation of the engine.

The engine sound reproduction device may include: a signal processing controller configured to reproduce the engine characteristic-based engine sound in real time during the operation of the engine; a vehicle sensor configured to detect a vehicle speed, an accelerator pedal position value and an engine RPM including vibration and pressure by the operation of the engine, and provide the vehicle speed, the accelerator pedal position value and the engine RPM to the signal processing controller; and an audio device configured to reproduce an engine sound using the engine characteristic-based engine sound outputted from the signal processing controller.

The signal processing controller may include: a data input board connected to the vehicle sensor and configured to perform controller area network (CAN) data communication, a central processing unit (CPU) configured to process input data of the data input board into the engine order-based virtual engine sound, the drive mode-based virtual engine sound, the vehicle speed-based virtual engine sound, and the engine characteristic-based engine sound; and a data output board configured to output the engine characteristic-based engine sound of the CPU to the audio device.

The vehicle sensor may include the vibration through a vibration sensor, and detects the pressure through a pressure sensor. The vibration sensor may include a single-axis or multi-axis accelerometer or a microphone vibrometer, and the pressure sensor may include a combustion pressure sensor, a boost pressure sensor and an exhaust pressure sensor.

The audio device may include a speaker for reproducing sound. The speaker may include an audio speaker, an engine room speaker, a filtering speaker, a thin film speaker or a membrane speaker.

DETAILED DESCRIPTION

FIGS. 1 to 4 illustrate a real-time engine sound reproduction method and a vehicle using the same.

Figure 1:
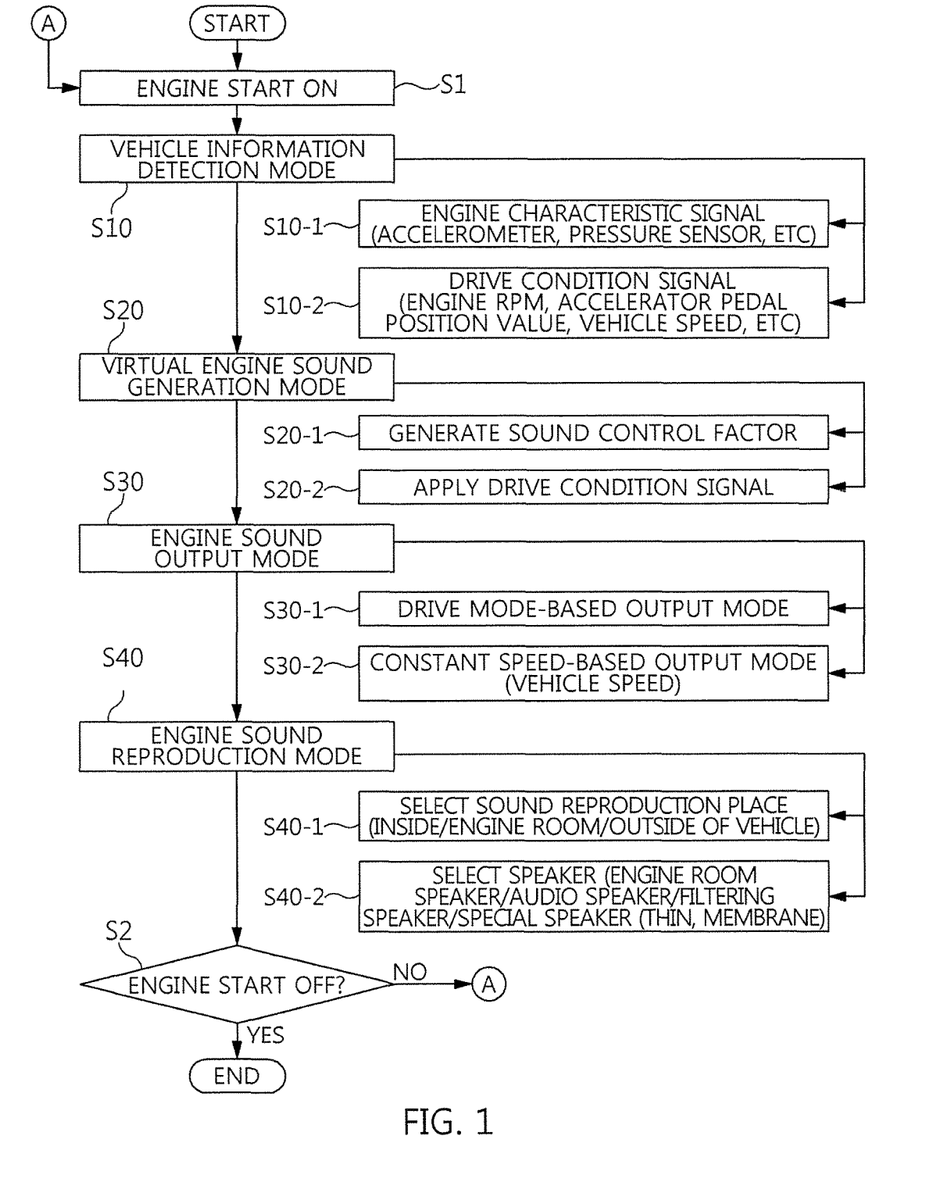
FIG. 1 is a flowchart illustrating a real-time engine sound reproduction method in accordance with exemplary embodiments of the present disclosure.

Referring to FIG. 1, the real-time engine sound reproduction method includes a vehicle information detection mode S10, a virtual engine sound generation mode S20, an engine sound output mode S30 and an engine sound reproduction mode S40 between an engine start on S1 and an engine start off S2, in order to implement a vehicle sound control technique for reflecting an engine behavior as real-time sound.

Figure 2:
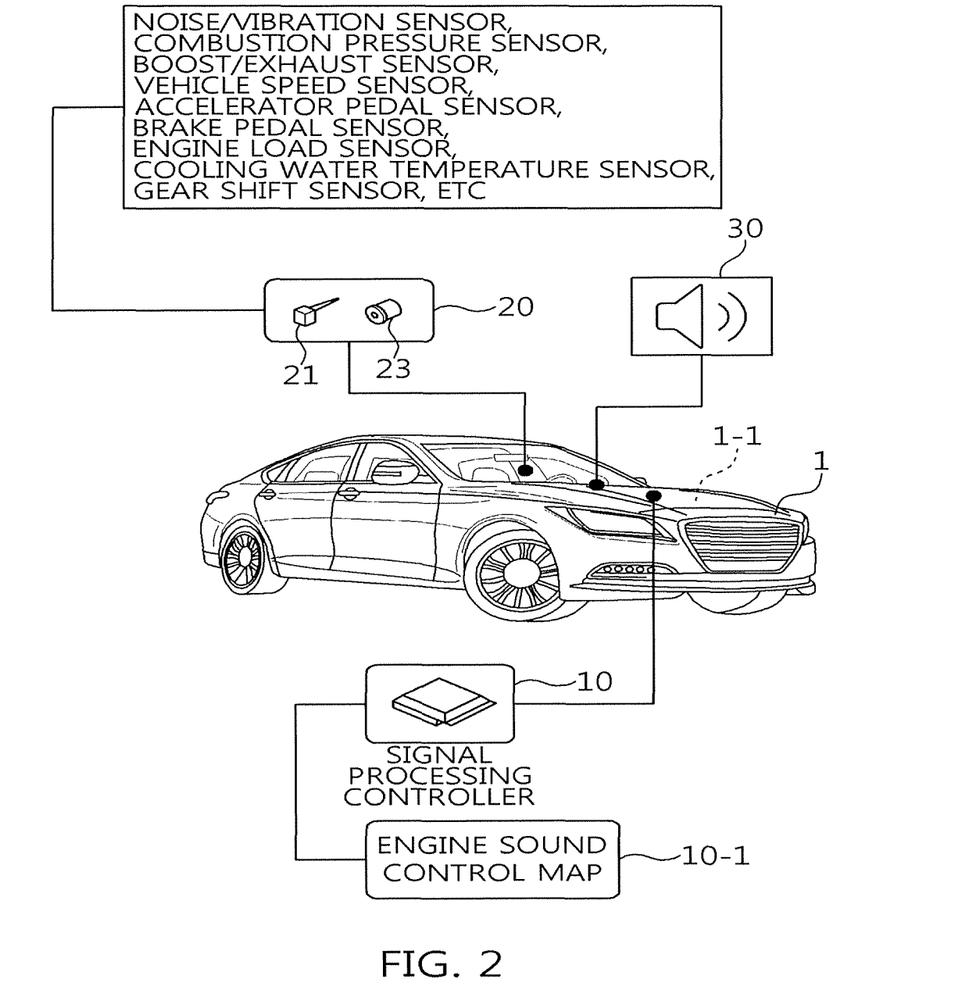
FIG. 2 illustrates an example of a vehicle in which real-time engine sound reproduction is performed in accordance with exemplary embodiments of the present disclosure.

Referring to FIG. 2, the vehicle 1 includes an engine 1-1 for generating power through an internal combustion engine and an engine sound reproduction device including a signal processing controller 10, a vehicle sensor 20 and an audio device 30.

The signal processing controller 10, the vehicle sensor 20 and the audio device 30 may be configured as follows.

The signal processing controller 10 calculates a sound control algorithm based on a drive mode (or drive condition) of the vehicle, using CAN communication information and real-time sensor values obtained by processing detection signals of the vehicle sensor 20 as input data. Furthermore, the signal processing controller 10 controls the engine 1-1, and controls an output of the audio device 30 in connection with an audio matching line graph of an engine sound control map 10-1.

The vehicle sensor 20 includes a vibration sensor 31 and a pressure sensor 33 as well as mounted sensors for detecting an operation of the engine 101 and a gear shift pattern or position. The vibration sensor 31 is an engine vibration signal measurement device such as a single-axis/multi-axis accelerometer or microphone vibrometer, and the pressure sensor 33 is a measurement sensor for measuring a combustion pressure, boost pressure or exhaust pressure for an intake system or exhaust system. The basically mounted sensors include a vehicle speed sensor, accelerator pedal sensor, brake pedal sensor, engine load sensor, cooling water temperature sensor, gear shift sensor and the like.

The audio device 30 includes a speaker for playing sound. The speaker may include an audio speaker installed in a cluster 102 constituting a driver's seat, an engine room speaker installed in an engine room having the engine 1-1 housed therein or a filtering speaker or special speaker (for example, thin film or membrane speaker).

Figure 3:
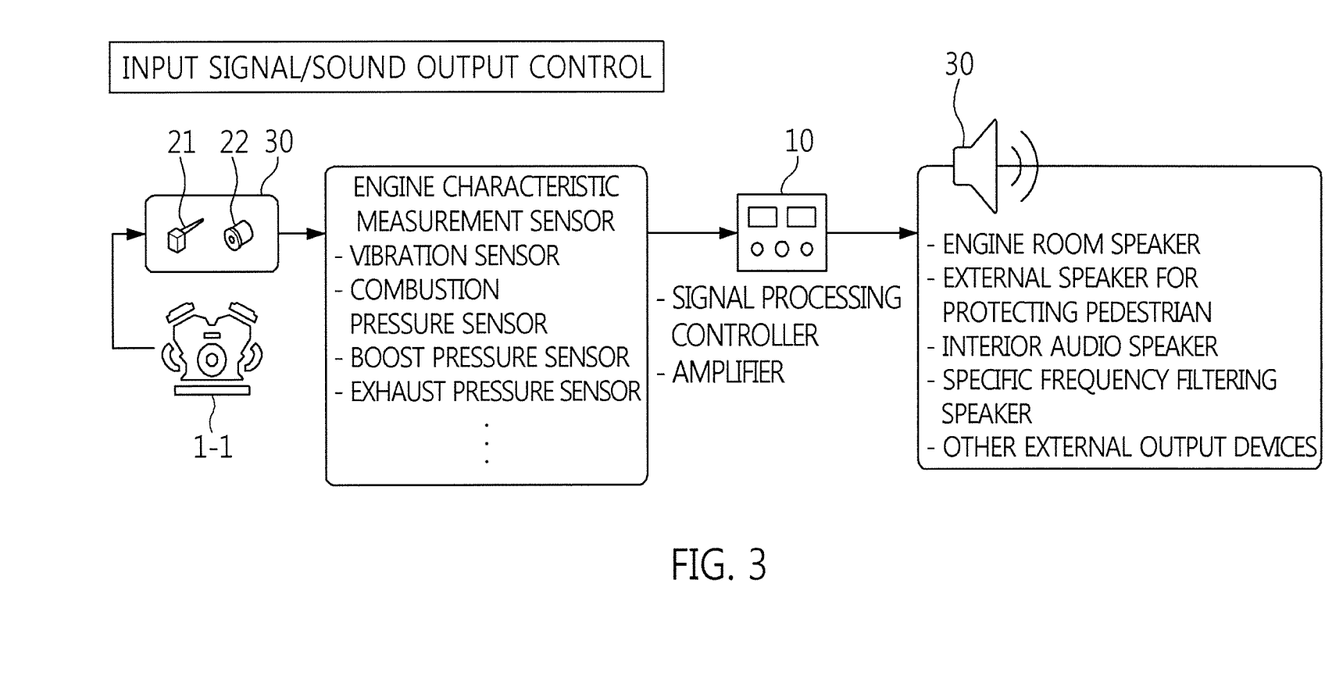
FIG. 3 illustrates real-time engine sound reproduction being performed by an engine sound reproduction device of a vehicle in accordance with exemplary embodiments of the present disclosure.
Figure 4:
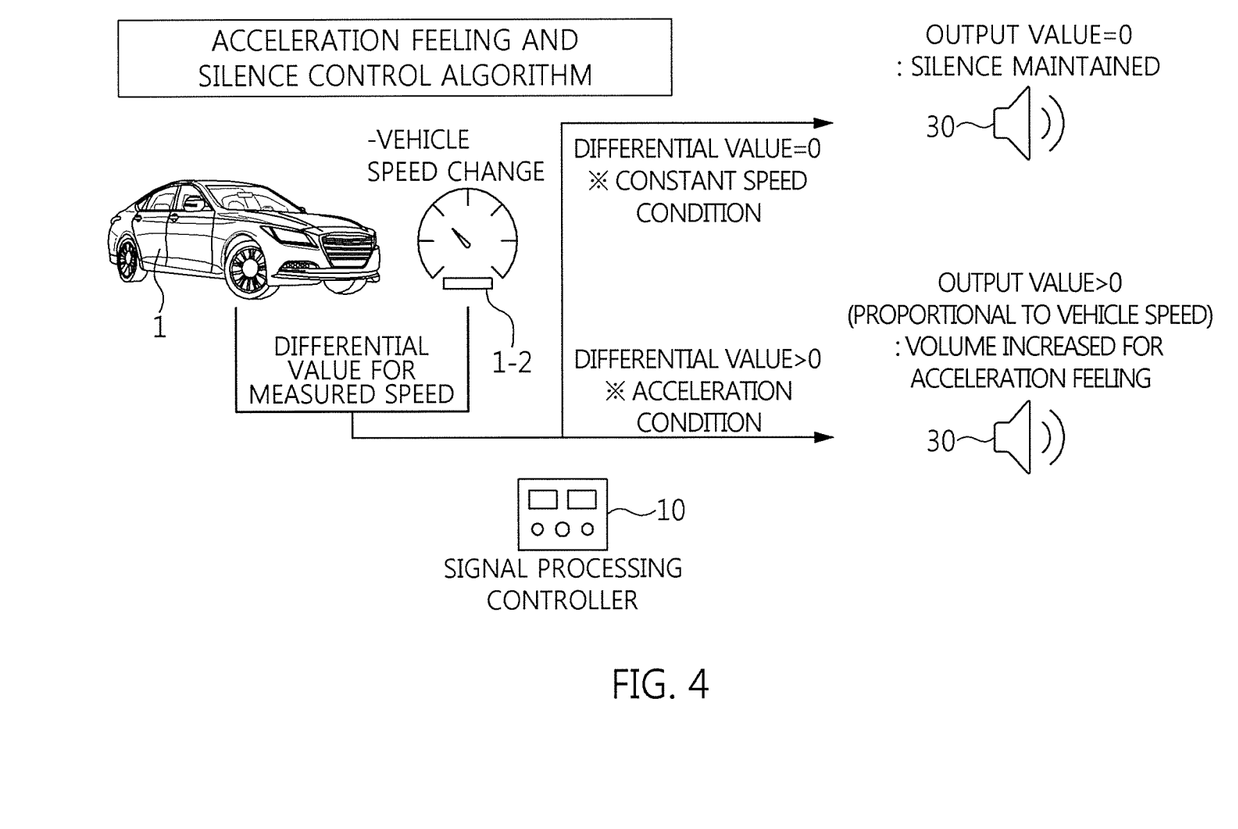
FIG. 4 illustrates an example in which an engine sound is divided into an engine sound for acceleration and an engine sound for constant speed sound through an engine sound reproduction device in accordance with exemplary embodiments of the present disclosure.

Referring to FIG. 3, the engine sound reproduction device performs a real-time engine sound reproduction operation through the information detection operation of the vehicle sensor 20, the algorithm processing operation of the signal processing controller 10 and the engine sound reproduction operation of the audio device 30. Referring to FIG. 4, the engine sound reproduction device reproduces engine sound based on vehicle speed of the vehicle 1 by applying a differential value of the vehicle speed as a final output of the audio device 30. As a result, when the vehicle 1 is driven at a constant speed, silence can be maintained against noise, vibration and harshness (NVH) of the vehicle 1, which makes it possible to increase the merchantable quality of the vehicle. Furthermore, when the vehicle 1 is accelerated according to a driver's intention, the engine sound reproduction device can generate sound suitable for the acceleration feeling, and allow the driver to have fun to drive. Therefore, the merchantable quality of the vehicle can be improved, or satisfied, in terms of two aspects.

Referring to FIGS. 1 to 4, the real-time engine sound reproduction method is performed as follows.

In the vehicle information detection mode S10, the engine sound reproduction device checks an engine characteristic signal through detection values of the vibration sensor 31, the pressure sensor 33 and the accelerometer of the vehicle sensor 20, which are mounted in the engine 101 of the vehicle 1, at step S10-1. Then, the engine sound reproduction device checks a drive condition signal through an engine RPM, acceleration pedal position and vehicle speed, which are detected by the engine and accelerator pedal sensors of the vehicle sensor 20, at step S10-2. Thus, in the vehicle information detection mode, the engine sound reproduction device can recognize an engine level change depending on an engine load through all sensors capable of measuring engine characteristics, and measure RPM information (order component) by an engine explosion stroke.

In the virtual engine sound generation mode S20, the algorithm of the signal processing controller 10 of the vehicle 1 is operated to perform a sound control factor generation step S20-1 and a drive control signal generation step S20-2 using a sound control factor generated at step S20-1. In the virtual engine sound generation mode, a main sound decision factor can be extracted from an engine order component serving as a sound control factor, and set to an order component arrangement based on a level change of the main order component. Thus, a storing characteristic based on a sound characteristic to which the order component level is reflected can be applied to vehicle sound.

In the engine sound output mode S30, the algorithm of the signal processing controller 10 of the vehicle 1 is continued to perform a drive mode-based output mode at step S30-1, based on an echo-drive mode (ECO), silent drive mode (Comport) and dynamic drive mode (Sport) of the vehicle. Furthermore, during a constant speed operation in which an accelerator pedal stepping amount is not increased, a speed-based output mode S30-2 for two kinds of merchantable qualities (silence and acceleration feeling) is performed based on the vehicle speed. In the speed-based output mode S30-2, a differential value of the vehicle speed is applied as a final output. Thus, in the engine sound output mode, the engine sound reproduction device can provide a variety of engine sounds by optimizing a final output level and order component arrangement through a drive mode selection. Furthermore, during the constant speed operation, the engine sound reproduction device can maintain silence, thereby improving the merchantable quality of the vehicle. During the acceleration operation by the driver's intention, the engine sound reproduction device can provide sound suitable for the acceleration feeling, thereby allowing the driver to drive with enhanced enjoyment. In particular, in the engine sound mode output mode, the engine sound reproduction device outputs real-time information of the engine behavior measurement sensors for a gear shift pattern and load variation depending on a drive mode change, and optimally arrange the information. Therefore, the engine sound reproduction device can generate different engine sound for each acceleration and operation mode.

In the engine sound reproduction mode S40, the engine sound reproduction device can operate the speakers constituting the audio device 30 of the vehicle 1, and select a sound reproduction place at step S40-1 such that engine sound can be generated from various positions such as the inside/engine room/outside (pedestrian) of the vehicle. Furthermore, the engine sound reproduction device can select speakers at step S40-2 such that an engine sound can be outputted through various devices such as an engine room speaker/audio speaker/filtering speaker/special speaker (for example, a thin film or membrane speaker). Thus, in the engine sound reproduction mode, the engine sound can be reproduced through all systems which can output engine sound at various positions.

The real-time engine sound reproduction method can analyze main factors of engine order components to decide a sound of the vehicle and extract sound control factors of engine characteristics measured in real time, in order to generate a desired sound characteristic. Furthermore, the real-time engine sound reproduction method can provide sounds suitable for acceleration feeling and engine characteristics, using various output devices (for example, the speaker in the engine room and the audio speaker in the vehicle). Therefore, the real-time engine sound reproduction method can provide engine sound based on the power characteristic and load change of the engine, while the existing engine sound control techniques provide a recorded sound source or provide artificial sound using resonance.

Figure 5:
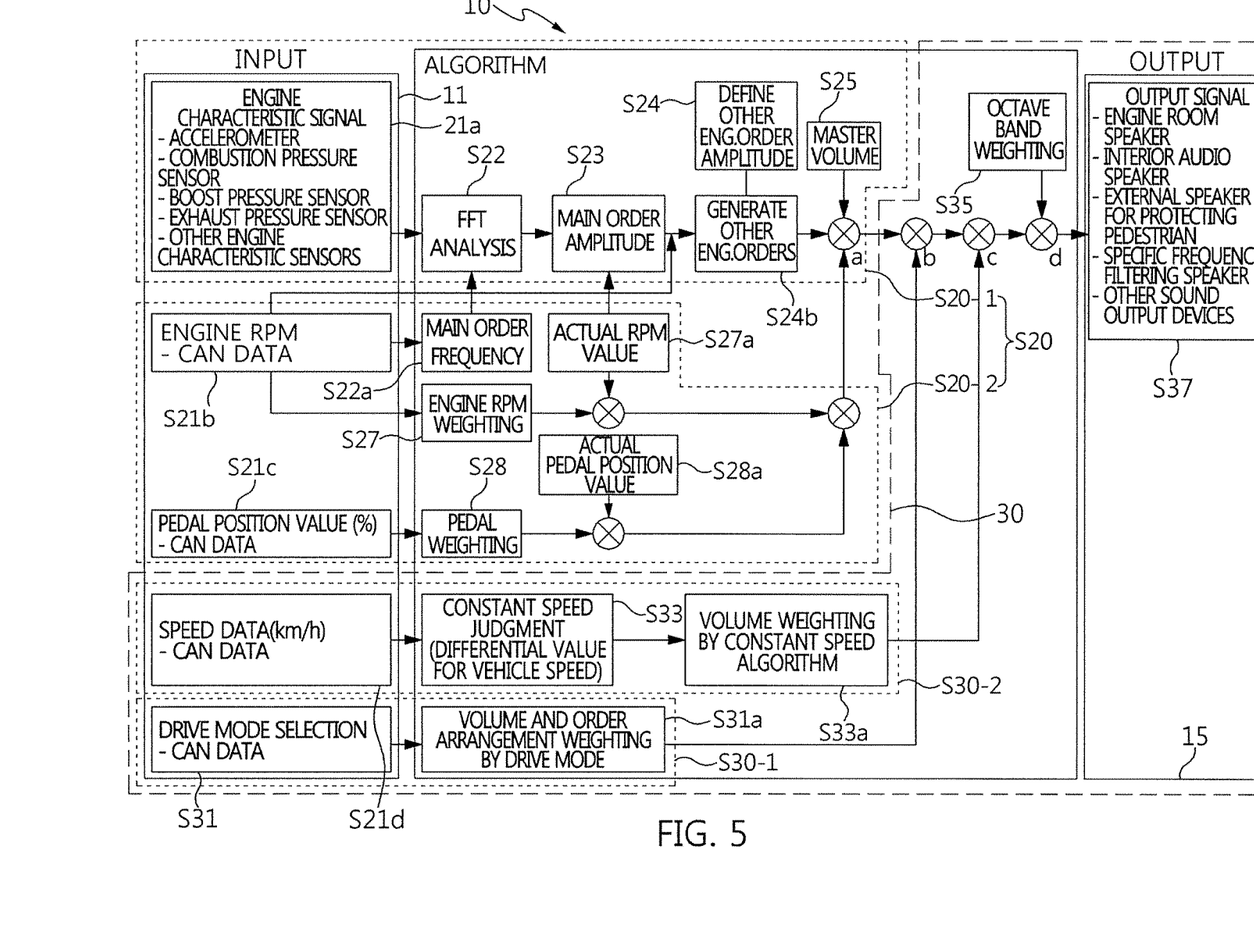
FIG. 5 illustrates a real-time engine sound reproduction operation of a signal processing controller in accordance with exemplary embodiments of the present disclosure.

FIG. 5 illustrates an exemplary configuration and algorithm of the signal processing controller 10.

Referring to FIG. 5, the signal processing controller 10 includes a data input board 11, a central processing unit (CPU) 13 and a data output board 15 as hardware components. In this case, each of constituent parts included in the data input board 11, the CPU 13 and the data output board 15 may be implemented with a hardware element or software filter (logic).

In particular, the signal processing controller 10 may be connected to a separate storage device for storing a sound source which is generated for each condition through the algorithm. Furthermore, the signal processing controller 10 may input the sound source generated for each condition to an active sound design (ASD) module of the separate storage device, such that a virtual sound source can be replaced with an actual engine sound.

For example, the data input board 11 includes an analog to digital (A/D) board, is connected to the vehicle sensor 20, and divided into an engine characteristic signal input part and a drive condition signal input part.

The engine characteristic signal input part includes an accelerometer input part for a vibration signal measurement value, a pressure input part for a combustion pressure measurement value, boost pressure measurement value or exhaust pressure measurement value, and other input parts for detection values of the engine load sensor, the cooling water temperature sensor and the gear shift sensor. The engine characteristic signal input part processes data for engine sound control. The drive condition signal input part processes CAN data for a drive mode-based output and a vehicle speed-based output, using detection values for an engine RPM of the vehicle speed sensor, a pedal position of the accelerator pedal sensor, a vehicle speed of the vehicle speed sensor and a drive mode (or drive condition) of the vehicle (for example, a driver's mode switch operation or an output of an engine controller).

For example, the CPU 13 is divided into a sound control factor generation part linked to the engine characteristic signal of the data input board 11, a drive condition signal generation part linked to the engine RPM/pedal position of the data input board 11, and a sound division and output part linked to the drive mode and speed data of the data input board 11.

The sound control factor generation part includes a fast Fourier transform (FFT) analysis part connected to the engine characteristic signal input part, a main order amplitude part (or main order component amplitude part), a drive condition signal input part as basic elements, an engine order generation part linked to an other order amplitude part and a master volume part.

The drive condition signal generation part includes a main order frequency part linked to the drive condition signal part in connection with the FFT analysis part, an engine RPM weighting part linked to the drive condition signal input part and an actual RPM value part, a pedal weighting part linked to the drive condition signal input part and an actual pedal position value part. Therefore, the sound control factor generation part and the drive condition signal generation part generate an engine order-based virtual engine sound (a) by combining outputs of the other engine order generation part, the engine RPM weighting part and the pedal weighting part with the magnitude of a sound volume set by the master volume part.

The sound division and output part includes a vehicle speed-based output part, an octave band weighting part and a signal output part. The constant speed-based output part includes a drive mode-based output part (volume and order arrangement weighting by drive mode) linked to the drive condition signal input part, a constant speed judgment part linked to the drive condition signal input part, and a constant speed weighting part (volume weighting by constant speed algorithm) which receives an output of the constant speed judgment part. The octave band weighting part combines outputs of the drive mode-based output part and the vehicle speed-based output part with a sound control output, and the output sound part sends an output of the octave band weighting part to the outside. The octave band of the octave band weighting part indicates a sound pressure level at which a sound spectrum is approximately expressed. Therefore, the engine order-based virtual engine sound (a) of the drive condition signal generation part is generated as a final engine characteristic-based engine sound (d) through the sound division and output part.

The data output board 15 includes a digital to analog (D/A) board, and is connected to the audio device 30. Thus, the data output board outputs the engine characteristic-based engine sound (d) such that the audio device 30 plays the engine characteristic-based engine sound (d) of the CPU 13.

Referring to the algorithm of the signal processing controller 10 in FIG. 5, the signal processing controller 10 checks an engine characteristic signal of step S10-1 and a drive condition signal of step S10-2 through the data input board 11, performs the virtual engine sound generation mode S20 including a sound control factor generation step S20-1 and a drive condition signal generation step S20-2, and performs the engine sound output mode S30 including a drive mode-based output step S30-1 and a vehicle speed-based output step S30-2.

The sound control factor generation step S20-1 includes a main order extraction step S22 of excluding a main order from engine order components of an engine vibration signal through FFT for an engine characteristic signal of the FFT analysis part in connection with an engine characteristic signal input step S21a, a main order amplification step S23 of amplifying the extracted main order to a main order amplitude through the main order amplitude part, a main engine order output step S24 of outputting a main engine order through a combination of the main order amplitude and other order amplitudes in connection with an other order amplitude definition step S24a, and a master volume step S25 of combining the master volume of the master volume part with the generated engine order. At step S22, the main order frequency part receives a main order frequency extracted at a main order frequency extraction step S22a in connection with an engine RPM input step S21b.

The drive condition signal generation step S20-2 includes: a main order frequency extraction step S22a in which the main order frequency part extracts a main order frequency of an engine RMP in connection with an engine RPM input step S21b and provides the extracted main order frequency to the FFT analysis part; an engine RPM weighting step S27 in which the engine RPM weighting part adds a weight to the engine RPM in connection with the engine RPM input step S21b and outputs the engine RPM as a current engine load, the engine RPM being combined with an actual RPM value by the actual RPM value part at S27a; and a pedal position value output step S28 in which the pedal weighing part adds a weight to a pedal position value in connection with a pedal position value input step S21c and outputs the pedal position value as a current pedal position, the pedal position value being combined with an actual pedal position value by the actual pedal position value part at step S28a. As a result, the current engine load of step S27 and the current pedal position value of step S27 are combined with each other, and then combined with the main engine order of the engine order generation part at a master volume step S25. Then, the engine order-based virtual engine sound (a) is generated.

The sound division and output step S30 is divided into a drive mode sound generation step S30-1 and a vehicle speed sound generation step S30-2. In the drive mode sound generation step S30-1, the drive mode-based output part performs volume and order arrangement weighting at step S31a in connection with a drive mode selection step S31. In the vehicle speed sound generation step (volume weighting by the constant speed algorithm) S30-2, the constant speed judgment part utilizes a differential value of the vehicle speed at step S33 in connection with a speed data input step S21d, and the constant speed weighting part applies a differential speed load using the differential value of the vehicle speed at step S33a. As a result, the volume and order arrangement output S31a is combined with the engine order virtual engine sound (a) and generated as a drive mode-based virtual engine sound (b), and the differential speed load output S33a is combined with the drive-mode based virtual engine sound (b) and generated as a vehicle speed-based virtual engine sound (c).

In an octave band weighing step S35, the octave band weighting part combines the engine order-based virtual engine sound (a) of the sound control factor generation step S20-1 and the drive condition signal generation step S20-2, the drive mode-based virtual engine sound (b) of the drive mode sound generation step S30-1, and the vehicle speed-based virtual engine sound (c) of the vehicle speed sound generation step S30-2 with an octave band, thereby generates the engine characteristic-based engine sound (d).

Then, in a sound output step S37, the output sound part outputs the engine characteristic-based engine sound (d) such that the audio device 30 reproduces various engine sounds in real time, using the engine characteristic-based engine sound (d) through the data output board 15.

FIGS. 6 to 9 illustrate that the engine characteristic-based engine sound (d) is applied to the real-time engine sound reproduction control, and reproduced as various engine sounds.

Figure 6:
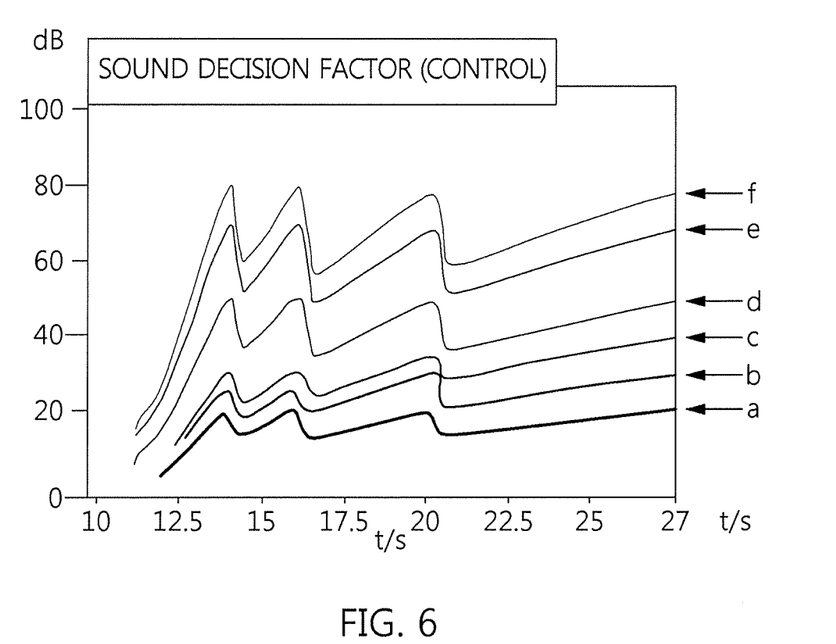
FIG. 6 illustrates an example in which a sound decision factor of a signal processing controller is applied in accordance with exemplary embodiments of the present disclosure.

FIG. 6 illustrates an example of a sound decision factor for the engine characteristic-based engine sound (d), and the sound decision factor reflects level changes of order components as a main engine order based on an operation of the engine 1-1. For example, the level changes of the order components are divided depending on sound volumes a to f which are arranged in a descending order of magnitude. As a result, the volume and order arrangement may decide a sound characteristic, and the sound volumes a to f may be selectively applied to reproduce an engine sound to which a strong characteristic of vehicle sound is applied.

Figure 7:
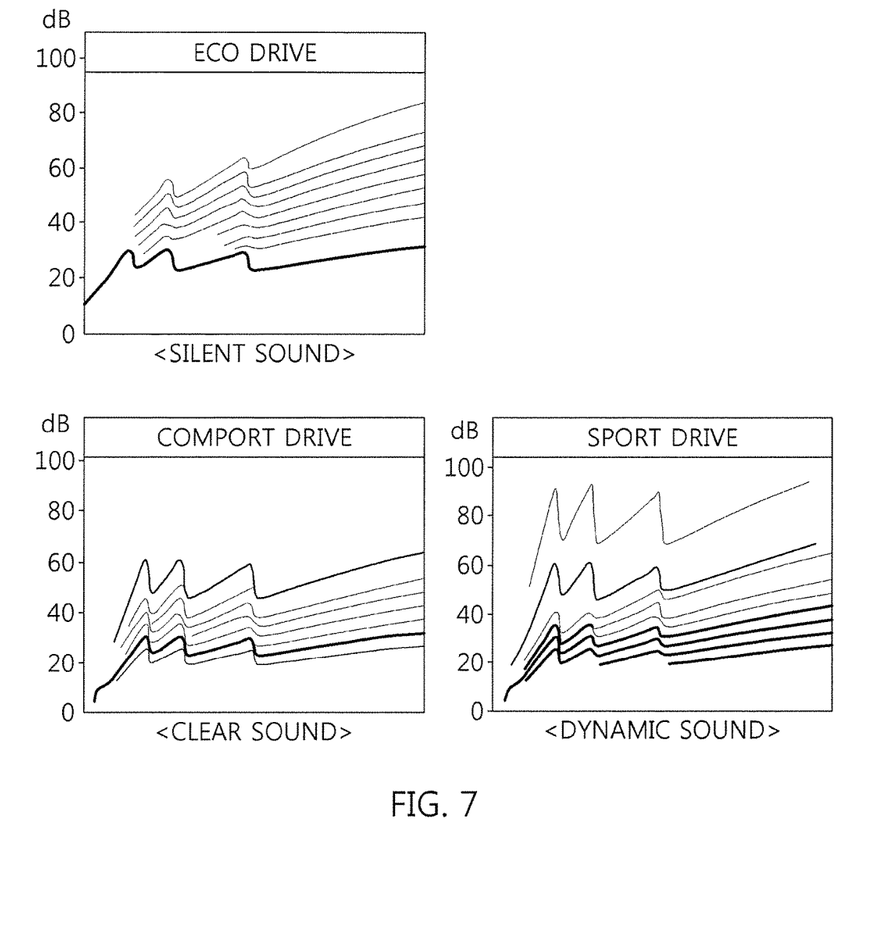
FIG. 7 illustrates an engine sound for multiple drive modes in accordance with exemplary embodiments of the present disclosure.

FIG. 7 illustrates engine sound for each drive mode by the engine characteristic-based engine sound (d), and the engine sound for each drive mode is provided as various sounds through the volume and order arrangement weighting by the drive mode selection. In particular, while a gear shift pattern and RPM variation by a drive mode change are inputted as real-time information through the engine behavior measurement sensors of the vehicle sensor 20, the engine sound for each drive mode can be provided as natural acceleration sound or different sound for each mode through the volume and order arrangement weighting. In FIG. 7, a sound difference is illustrated as a waveform thickness difference. As illustrated in FIG. 7, the waveform thickness of the echo drive is provided as silent sound, the waveform thickness of the comport drive is provided as clear sound, and the waveform thickness of the sport drive is provided as dynamic sound.

Figure 8:
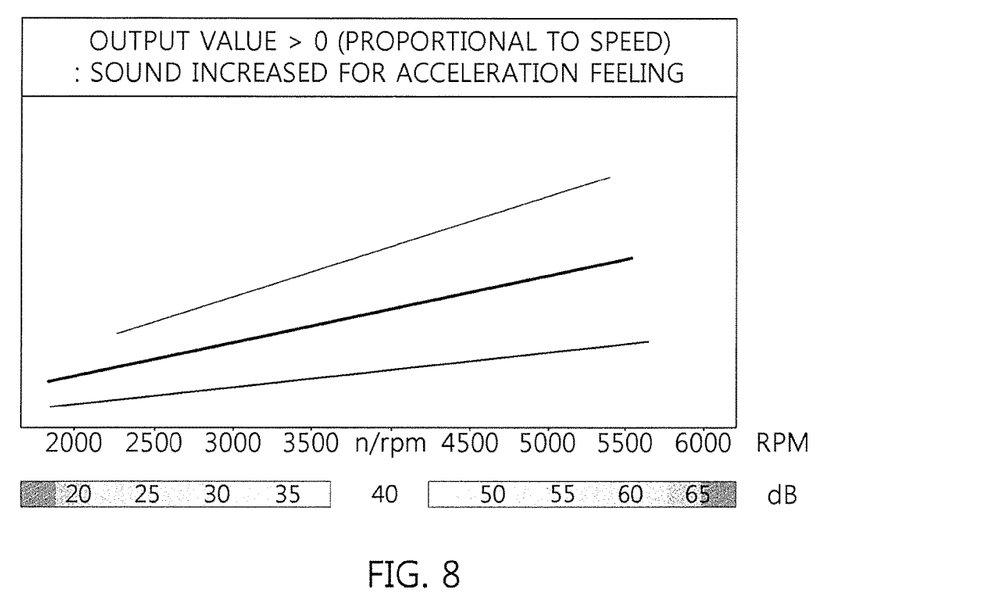
FIG. 8 illustrates an engine sound for acceleration in accordance with exemplary embodiments of the present disclosure.

FIG. 8 illustrates an engine sound for acceleration feeling by the engine characteristic-based engine sound (d), and the output value of the engine sound for acceleration feeling is increased in proportion to the vehicle speed. Thus, when the vehicle is accelerated by a driver's intention, engine sound suitable for acceleration feeling is reproduced as indicated by a difference between waveform thicknesses in FIG. 8. As a result, the engine sound for, or during, acceleration can increase a driver's enjoyment.

Figure 9:
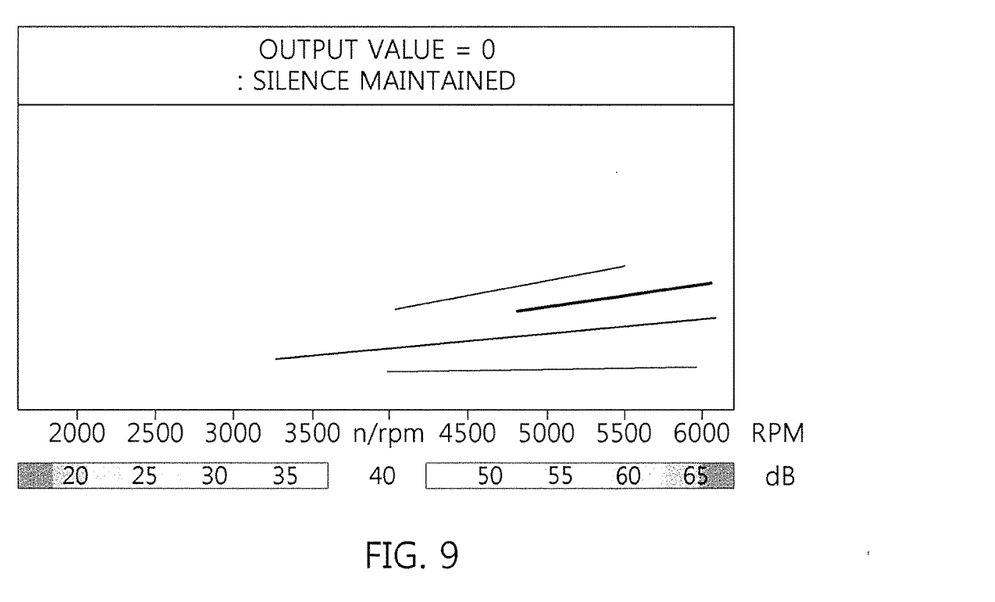
FIG. 9 illustrates an engine sound for constant speed in accordance with exemplary embodiments of the present disclosure.

FIG. 9 illustrates an engine sound for constant speed by the engine characteristic-based engine sound (d), and the output value of the engine sound for constant speed is not increased/decreased but maintained. Thus, as indicated by a difference between waveform thicknesses in FIG. 9, silence of the vehicle can be maintained when the vehicle is driven at constant speed, thereby improving the merchantable quality of the vehicle.

In the above-described real-time engine sound reproduction method, an engine operation characteristic by an operation of the engine 1-1 is applied to the engine characteristic-based engine sound by the signal processing controller 10, the engine characteristic-based engine sound is divided into the drive mode-based output to which the drive mode of the vehicle is applied and the vehicle speed-based output to which a difference between constant speed and acceleration is applied, and the drive mode-based output and the vehicle speed-mode output are reproduced as the engine characteristic-based engine sound. Thus, active real-time sound reproduction can be performed based on the engine characteristic sensor values measured in real time. In particular, when the vehicle is driven at a constant speed, sound for silence is reproduced, but when the vehicle is accelerated, various sounds can be reproduced. Therefore, the real-time engine sound reproduction method can provide engine sound suitable for a driver's intention.

In accordance with the exemplary embodiments of the present disclosure, the vehicle using the real-time engine sound reproduction method may have the following effects.

First, since the real-time sound reproduction is actively performed through engine characteristic sensor values measured in real time, a driver's enjoyment can be significantly improved through the auditory effects. Second, since sound reproduction is performed according to constant-speed and acceleration operations of the vehicle through the vehicle speed-based control algorithm, the NVH performance can be improved. Third, since silence is maintained when the vehicle is driven at a constant speed but various sounds are reproduced when the vehicle is accelerated, an engine sound suitable for a driver's intention for passing or acceleration can be provided. Fourth, since the main order components (components generated by rotation) and real-time level changes measured by the sensors are used as input values based on the engine characteristic measurement sensor values, the main factors of engine sound are applied to reproduce the engine sound. Fifth, sound control can be performed through various output devices such as an engine room speaker, an interior audio speaker, a specific frequency filtering speaker or an external speaker for protecting a pedestrian. Sixth, since the engine sound control technique capable of overcoming the limits of the virtual sound source playing method and the vibration sound providing method is used, the merchantable quality of the vehicle can be significantly improved.

While the present disclosure has been described with respect to the specific embodiments, it will be apparent to those skilled in the art that various changes and modifications may be made without departing from the spirit and scope of the disclosure as defined in the following claims.

What is claimed is:

1. A real-time engine sound reproduction method, comprising;
   determining, with a signal processing controller, a drive condition of a vehicle based on a vibration value measured through a sensor for measuring vibration of an engine; and
   reproducing, with an output device, a controlled engine sound based on an order component indicated by the engine vibration characteristic outputted in real time;
   wherein the order component is combined with an engine order component generated by a rotation speed of an engine, an engine level change for various loads of the engine, and a master volume;
   wherein the engine order component is extracted as a vibration signal and a pressure signal based on the operation of the engine, and the pressure signal is any one or more of combustion pressure, a boost pressure and an exhaust pressure; and
   wherein the extraction of the engine order component reflects detection values of the engine rotation speed, an accelerator pedal position value and a vehicle speed.

2. The real-time engine sound reproduction method of claim 1, wherein the engine sound is an engine characteristic-based engine sound, the engine characteristic-based engine sound is divided into a drive mode-based output to which a drive mode of the vehicle is applied and a vehicle speed-based output to which an operation state of the vehicle is applied, and the drive mode-based output and the vehicle speed-based output are reproduced as the engine sound by the output device.

3. The real-time engine sound reproduction method of claim 2, wherein the engine characteristic-based engine sound is generated by combining a drive mode-based virtual engine sound and a vehicle speed-based virtual engine sound with an octave band.

4. The real-time engine sound reproduction method of claim 2, wherein the drive mode-based output is based on the drive mode of the vehicle.

5. The real-time engine sound reproduction method of claim 4, wherein the drive modes include an echo drive mode, a comfort drive mode and a sport drive mode.

6. The real-time engine sound reproduction method of claim 2, wherein the vehicle speed-based output is based on a constant speed and an acceleration determined through an operation of an accelerator pedal.

7. The real-time engine sound reproduction method of claim 6, wherein during the acceleration condition, a differential value for the constant speed is utilized.

8. A vehicle, comprising:
   an engine sound reproduction device that generates an engine characteristic-based engine sound by combining an engine order-based virtual engine sound based on an engine vibration characteristic due to an operation of the engine with a drive mode-based virtual engine sound and a vehicle speed-based virtual engine sound; and
   an audio device that reproduces the engine characteristic-based engine sound in real time during the operation of the engine;
   wherein the engine sound reproduction device comprises:
   a signal processing controller for reproducing the engine characteristic-based engine sound in real time during the operation of the engine; a vehicle sensor for detecting a vehicle speed, an accelerator pedal position value and an engine RPM including vibration and pressure by the operation of the engine, and providing the vehicle speed, the accelerator pedal position value and the engine RPM to the signal processing controller.

9. The vehicle of claim 8, wherein the signal processing controller comprises: a data input board connected to the vehicle sensor for performing controller area network (CAN) data communication, a central processing unit (CPU) for processing input data of the data input board into the engine order-based virtual engine sound, the drive mode-based virtual engine sound, the vehicle speed-based virtual engine sound, and the engine characteristic-based engine sound; and a data output board for outputting the engine characteristic-based engine sound of the CPU to the audio device.

10. The vehicle of claim 8, wherein the vehicle sensor detects the vibration through a vibration sensor, and detects the pressure through a pressure sensor.

11. The vehicle of claim 10, wherein the vibration sensor includes a single-axis or multi-axis accelerometer or a microphone vibrometer, and the pressure sensor includes a combustion pressure sensor, a boost pressure sensor and an exhaust pressure sensor.

12. The vehicle of claim 8, wherein the audio device includes a speaker for reproducing sound.

13. The vehicle of claim 12, wherein the speaker includes one or more of an audio speaker, an engine room speaker, a filtering speaker, a thin film speaker and a membrane speaker.

\* \* \* \* \*